United States Patent [19]

Pawlicki

[11] Patent Number: 5,015,117
[45] Date of Patent: May 14, 1991

[54] CONSTRUCTION MATERIALS WITH END CONNECTORS

[76] Inventor: Patrick S. Pawlicki, 27753 Hwy. 79, Santa Ysabel, Calif. 92070

[21] Appl. No.: 212,603

[22] Filed: Jun. 28, 1988

Related U.S. Application Data

[63] Continuation-in-part of Ser. No. 11,905, Feb. 6, 1987, abandoned.

[51] Int. Cl.5 .............................................. F16B 7/04
[52] U.S. Cl. .................................... 403/300; 403/340; 403/381; 403/374; 249/6; 249/7
[58] Field of Search ............... 403/339, 340, 305, 300, 403/407.1, 345, 292, 364, 386, 387, 400, 346, 381, 350, 188, 405.1, 389, 361, 348, 374, 409.1, 110, 190; 446/126–128; 249/1–3, 5–7, 9, 207, 219.1, 219.2, 192, 196; 404/48, 50, 51

[56] References Cited

U.S. PATENT DOCUMENTS

| | | |
|---|---|---|
| 1,640,739 | 8/1927 | Trester . |
| 2,791,868 | 5/1957 | Viken . |
| 2,964,294 | 12/1960 | Imonetti ........................ 403/409.1 X |
| 2,982,380 | 5/1961 | Rose . |
| 3,011,235 | 12/1961 | Pacheco . |
| 3,195,266 | 7/1965 | Onanian . |
| 3,258,282 | 6/1966 | Koenigshof . |
| 3,415,554 | 12/1968 | Papayoti . |
| 3,577,105 | 5/1971 | Jones, Jr. . |
| 3,749,432 | 7/1973 | Janssen . |
| 3,777,435 | 12/1973 | Perina . |
| 3,778,019 | 12/1973 | Stegmeier . |
| 3,802,206 | 4/1974 | Moore . |
| 3,847,489 | 11/1974 | Van Riper . |
| 3,926,294 | 12/1975 | Bastian ........................... 403/374 X |
| 3,999,878 | 12/1976 | Robinson . |
| 4,035,097 | 7/1977 | Bachand ............................ 403/348 |
| 4,114,241 | 9/1978 | Bisping . |
| 4,137,115 | 1/1979 | Lambert . |
| 4,340,200 | 7/1982 | Stegmeier . |
| 4,407,106 | 11/1983 | Beck . |
| 4,408,922 | 10/1983 | D'Alessio . |
| 4,579,312 | 4/1986 | White . |
| 4,582,447 | 4/1986 | Itoh . |
| 4,588,218 | 5/1986 | Guiler et al. . |
| 4,696,406 | 9/1987 | Karashima ...................... 403/345 X |
| 4,712,764 | 12/1987 | White . |
| 4,750,703 | 6/1988 | Gentilcore et al. . |

Primary Examiner—Peter M. Cuomo
Attorney, Agent, or Firm—Duane C. Bowen

[57] ABSTRACT

End plastic connectors on the ends of two construction members like concrete forms. Each connector has a pair of bosses on opposite corners and a pair of openings in opposite corners so that the bosses on one connector mate with the openings in the other connector. Each boss has an annular rib sized to press through the associated opening, which is circular with a pair of flats, to latch the connectors together. Each rib is spaced from the remainder of the associated connector a greater distance than the thickness of the material of the connectors around the openings thereby permitting limited angular adjustment in orientation between connectors. Each construction member is a piece of dimensional lumber in one form of the invention, to which the end connectors are attached by nailing. In the other form of the invention, each construction member is a plastic extrusion and the end connectors have protrusions interfitting into the plastic extrusion. The wall of the extrusion at one side is shaped into a lipped dove-tailed keyway extending from end to end of the extrusion. A locking cam secures a stake to the construction member. The clamp has a rectangular base that fits into the keyway and locks therein by turning. The plastics are formed of polyethylene, which has a release agent, and which has an ultraviolet stabilizer. Extrusions contain titanium dioxide pigmentation for maximum sun ray reflection to reduce extrusion flexibility by heating.

17 Claims, 5 Drawing Sheets

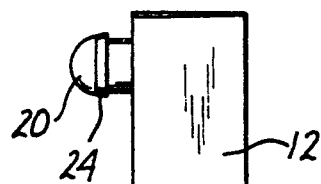
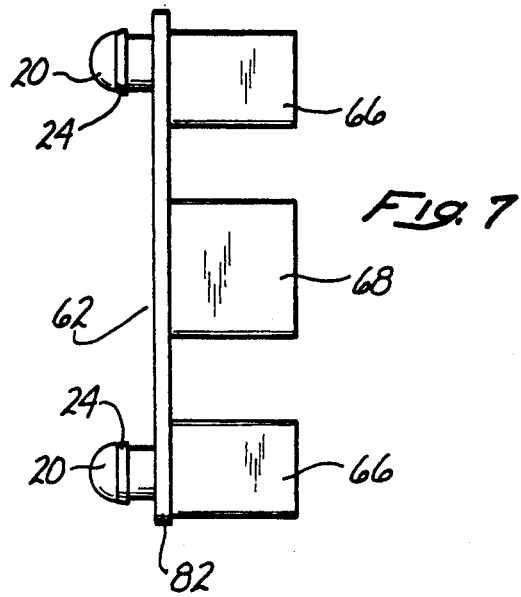
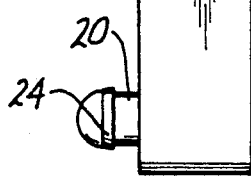
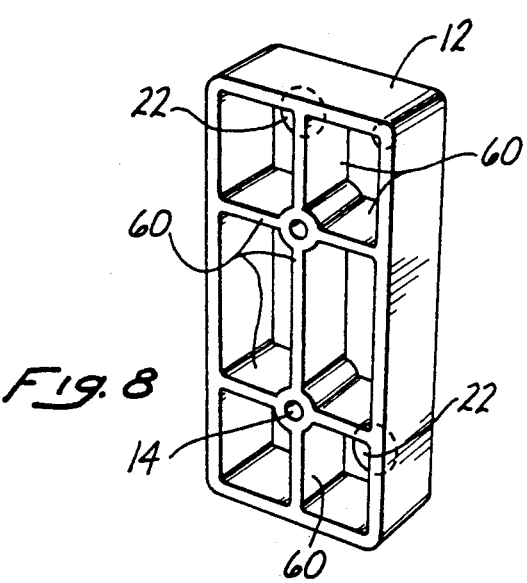
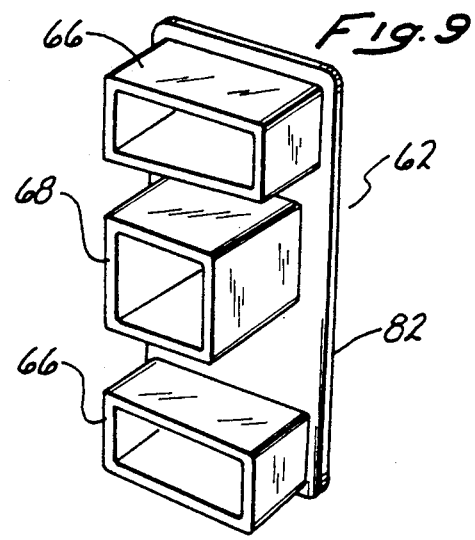
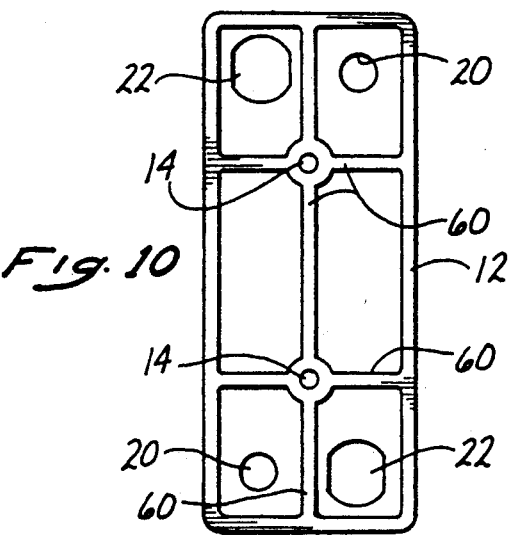
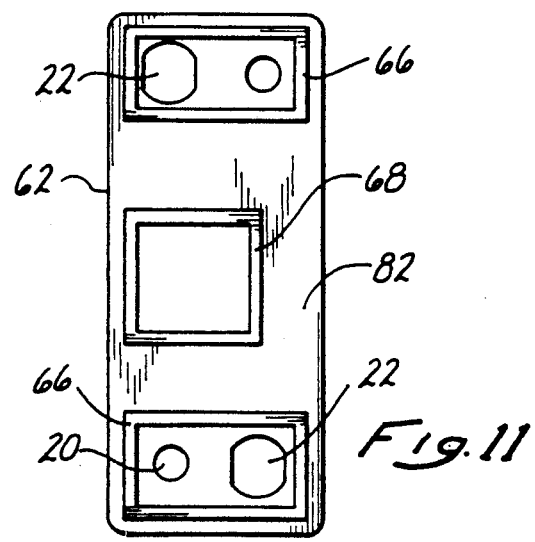

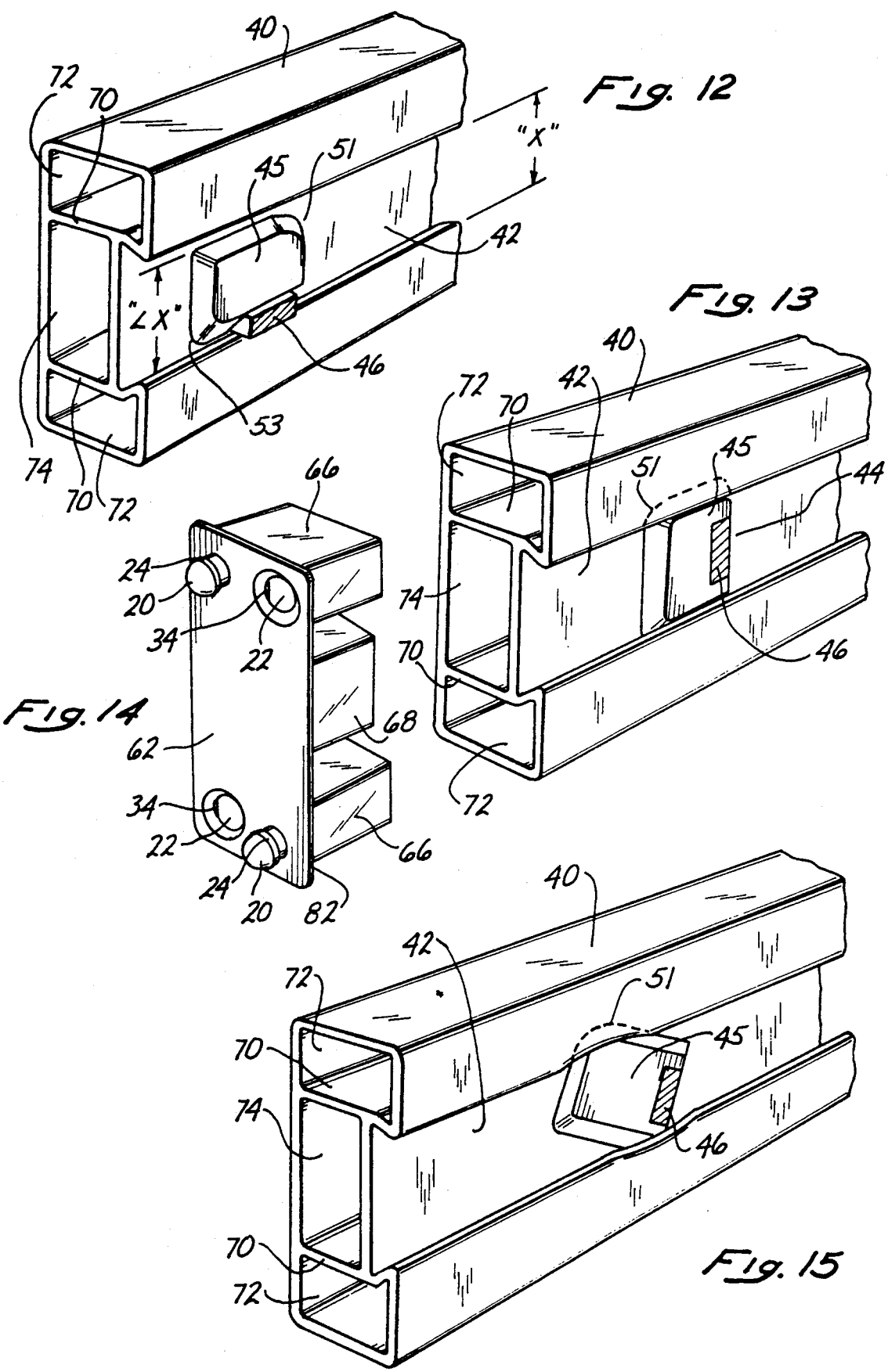

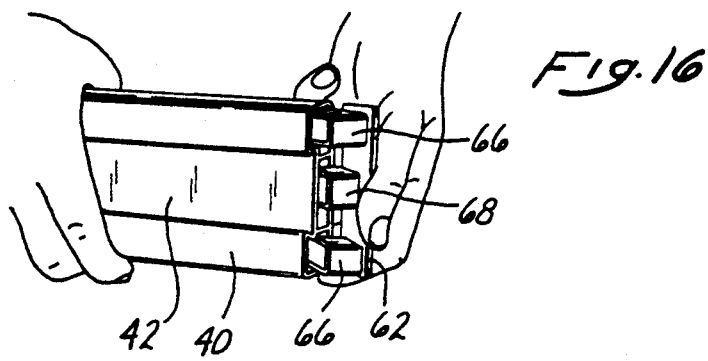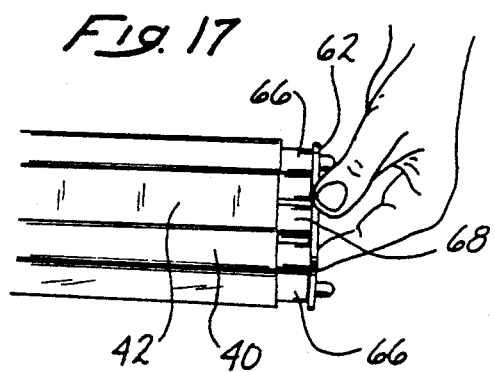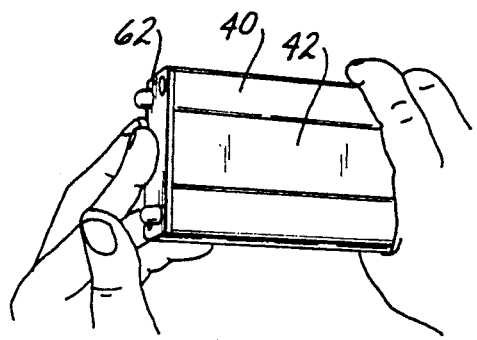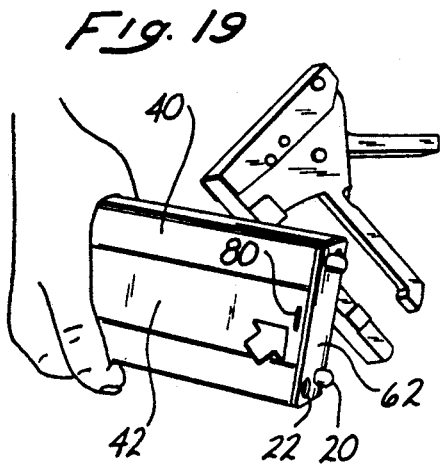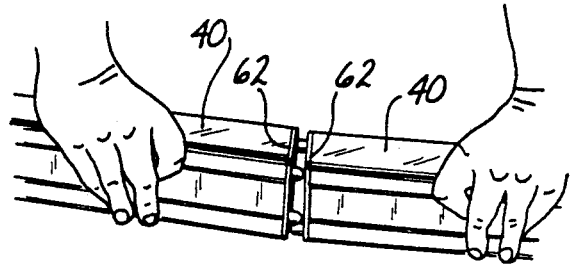

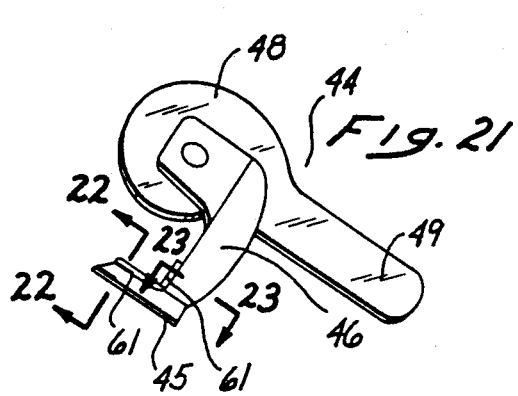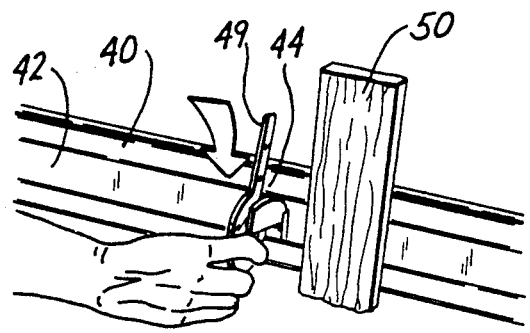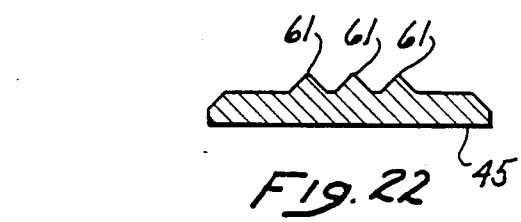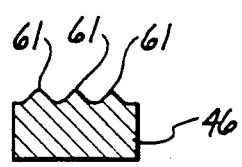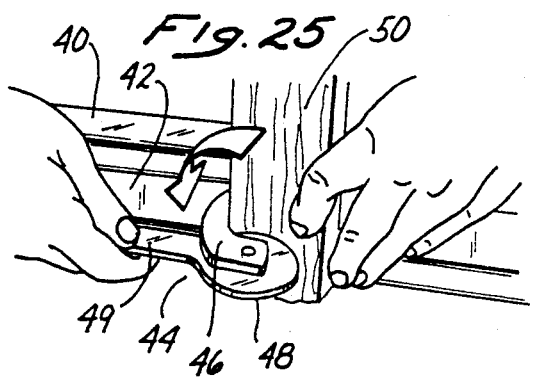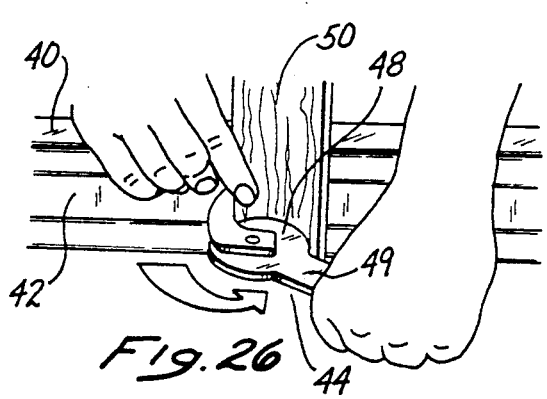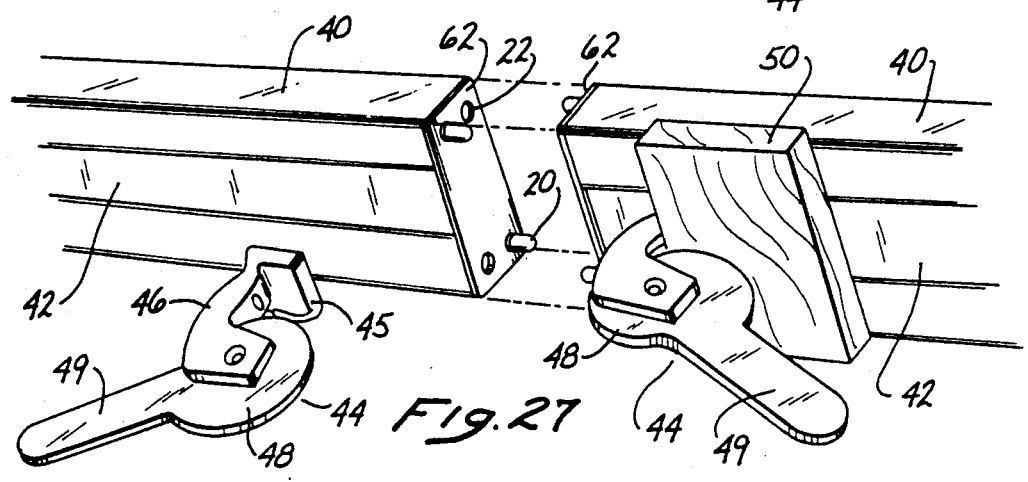

CONSTRUCTION MATERIALS WITH END CONNECTORS

This is a continuation-in-part of Ser. No. 07/011,905, filed Feb. 6, 1987 now abandoned.

BRIEF SUMMARY OF THE INVENTION

Background and Objectives

My invention relates to an improvement in construction materials having its primary application in connection with concrete forms.

Concrete forms for the edges of sidewalks, patios, etc., are presently made of wood or metal. I conceived of the idea of making such forms as plastic extrusions. Wood or metal forms become fouled and discolored with cement and other agents such as water, paint, plastic, asphalt or other adhering or staining substances. They need cleaning by scraping, spraying with oil, etc. Lumber is only useful about ten times for the purpose of sidewalk forms. Metal corrodes in the corrosive environment. The process of staking forms is laborious including such operations as toe nailing the ends of abutting wooden dimensional pieces, and pounding in stakes and nailing them to wooden dimensional pieces. One of the additional difficulties especially with steel forms is their weight. A worker can carry a number of my plastic extrusions without undue effort. Prior art forms weight three to ten times more than my plastic extrusions. The metal forms are expensive. The prior art materials require excessive labor to install, remove and renovate. Concrete tends to adhere to wood and metal forms, whereas I have provided plastic forms that have little adherence to concrete and easily part therefrom both in the cured and uncured states of concrete.

The objective of my invention is to avoid the problems set forth in the preceding paragraph with novel new plastic structures. Another objective is to secure together the ends of abutting forms with minimum time and effort and to later separate the ends of abutting forms with minimum time and effort. A further objective is to join and separate the form ends without employing destructive means like nails. Another objective is to clamp stakes to my plastic forms with maximum ease and later to separate the stakes from the plastic forms with maximum ease. A further objective is to employ cam locking to secure the stakes to the Plastic forms. It is an additional objective to provide a plastic construction to join together ends of concrete forms, whether the forms are wood or plastic.

My invention will be best understood, together with additional advantages and objectives thereof, when read with reference to the drawings.

DRAWINGS

FIGS. 6 and 7 are side views of the connector, the former being used with a concrete form made of lumber and the latter being used with a concrete form made as a plastic extrusion.

FIG. 8 is a rear perspective view of the connector shown FIG. 6.

FIG. 9 is a rear perspective view of the connector shown in FIG. 7.

FIG. 10 is a rear view of the connector shown in FIG. 6.

FIG. 11 is a rear view of the connector shown in FIG. 7.

FIG. 12 is a partial perspective view of an extrusion and of a clamp base as it is initially positioned in a keyway in the extrusion.

FIG. 13 is an enlarged partial perspective view of an extrusion and of a clamp base in the final position in the process of installation.

FIG. 14 is a perspective view of a connector used with the extrusions.

FIG. 15 is a partial perspective view of an extrusion and of a clamp base in an intermediate position in the process of installation.

FIGS. 16, 17 and 18 are sequential perspective views showing a plastic connector being installed in a plastic extrusion concrete form.

FIG. 19 indicates securement of the connector with a staple and a stapler gun used for this purpose.

FIG. 20 shows interconnection of connectors on the ends of plastic extrusion concrete forms.

FIG. 21 is a view of a side of a clamp.

FIG. 22 is a sectional view taken on line 22—22 of FIG. 21.

FIG. 23 is a sectional view taken on line 23—23 of FIG. 21.

FIGS. 24, 25, and 26 are sequential perspective views showing a stake being clamped to a plastic extrusion concrete form.

FIG. 27 is a perspective view indicating the end-to-end connection of a pair of plastic extrusion concrete forms. One plastic clamp is shown in disengaged position and one plastic clamp is shown clamping a stake to one of the extrusions.

SPECIFIC DESCRIPTIONS

Figure 1:
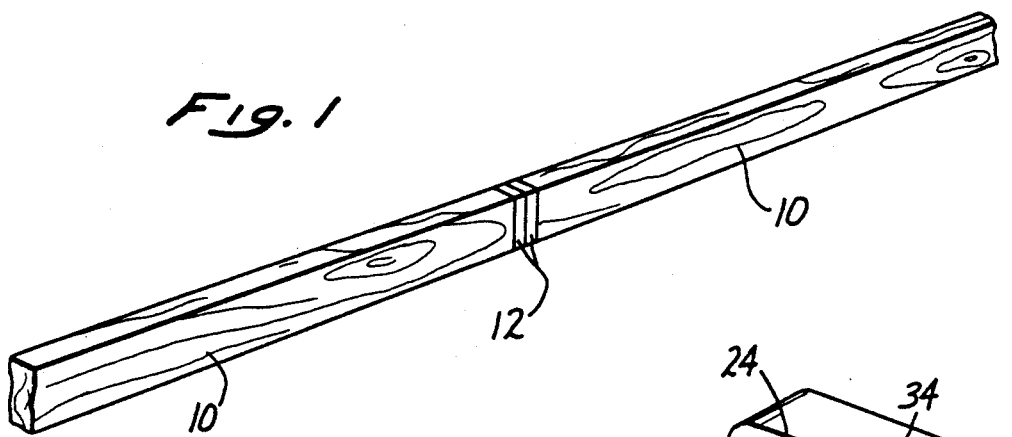
FIG. 1 is a perspective view of two lumber concrete forms connected together at their ends by plastic connectors forming a specific embodiment of my invention.
Figure 3:
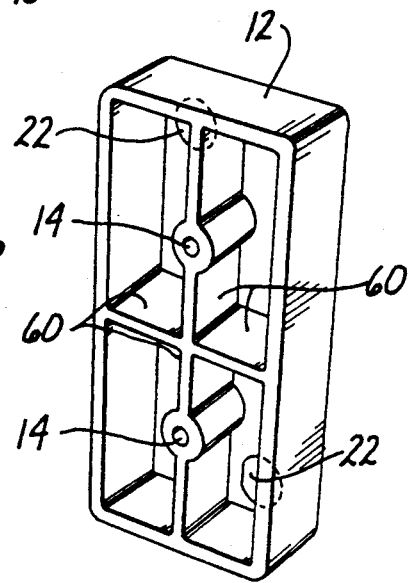
FIGS. 2 and 3 are front and back perspective views of the connectors shown in FIG. 1.
Figure 2:
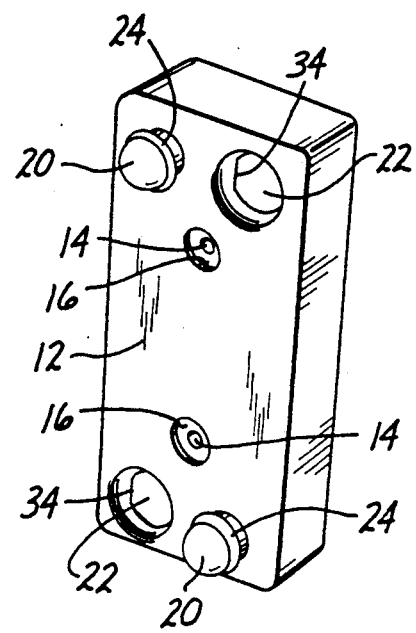

In FIG. 1 a pair of concrete forms 10 are shown such as are used to define the borders of sidewalks, patios, etc. In FIG. 1, I show the use of wood forms 10 but the forms instead can be manufactured as plastic extrusions, as is shown in other drawings. A pair of identical plastic end connectors 12 are attached to the ends of forms 10 by nails going through holes 14 (see FIGS. 2 and 3). Countersinks 16 are provided for the heads of the nails. The connectors 12 are interengageable and avoid the problem of connecting wood forms according to the previous practices in the art in which forms were toe nailed, were attempted to be aligned by the stakes used, a piece of wood was nailed across the joint, etc.

Connectors 12 are generally right-rectangular and generally match the cross-sections of the forms 10 which may be 2×4's, 2×6's, 2×8's, etc. Each connector 12 has a pair of bosses 20 and a pair of mating openings 22 on the side toward the other connector. Bosses 20 are disposed in two opposite corners and openings 22 are disposed in the other opposite corners. In this way, the bosses 20 on each connector will mate with the openings 22 in the associated connector. The connectors have sufficient thicknesses in the direction toward abutted pieces of lumber so that the length of bosses 20 in openings 22 can be accommodated without passing the planes of abutment to the ends of forms 10.

Each boss 20 preferably has an annular rib 24 which preferably is spaced from the remainder of the associated connector a greater distance than the thickness of the material of the connectors 12 around openings 22. Ribs 24 are sized to press through the openings 22 to latch the connectors together. The greater distance between rib 24 and connector versus the thickness of material around opening 22 permits limited angular adjustment between connectors and the forms 10 they are connected to. This means that any warp or lack in end squareness in forms 10 or a minor bend in a sidewalk border, etc., can be accommodated. The difference in thickness can be varied between 5% and 50% for lesser or greater angular adjustability.

Figure 4:
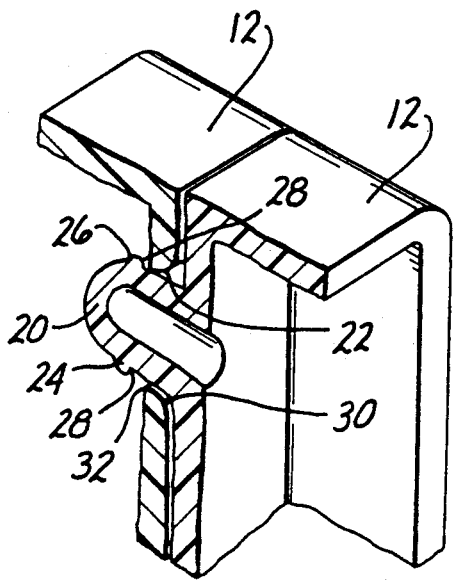
FIG. 4 is a partial perspective view, partly in section, of the interengagement of male and female connecting parts in the connectors.

As shown in FIG. 4, rib 24 can be shaped with better adjacent camming surfaces 26 for penetration into female opening 22 than the camming surfaces for withdrawal 28. Additionally or alternatively the entry lip 30 of opening 22 can be radiused for easy penetration but with a sharp corner 32 against withdrawal.

Figure 5:
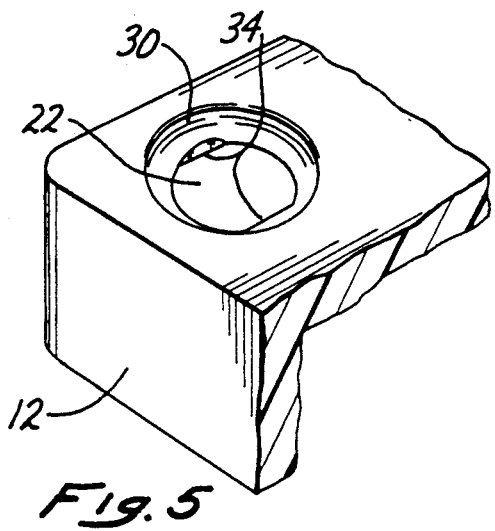
FIG. 5 is a partial perspective view of the female part showing opposed flats that are exaggerated for clarity of disclosure.

Experience has shown that opening 22 can wear and become larger after enough engagements with boss 20 in the abrasive environment of concrete, dirt, etc., if the process of engagement and disengagement is merely a stretching of a smaller circumference opening 22 over a greater circumference rib 24. A solution to the problem of deterioration of opening 22 or of rib 24 due to wear is to make opening 22 large enough to pass rib 24 except for a pair of diametrically opposed flats 34 that are spaced a lesser distance than the diameter across the rib 24. See FIG. 5. In this way the walls of opening 22 flex and deteriorations is minimized. It would be possible to use one flat 34 or more than two flats 34 but the use of two flats is considered preferable.

I prefer to use hollow plastic extrusions 40 instead of lumber for concrete forms. As far as I know, the use of a plastic extrusion for a concrete form was unknown before my invention. The only use of plastic in concrete forms before my invention, that I have become aware of, is that plastic topped counter tops were sawed to make concrete forms. I manufacture all plastic parts of high-density polyethylene, or a mixture of high and low density polyethylene, which has an added ingredient of a silicone or a Teflon release agent, and which has an added ingredient of an ultraviolet stabilizer. The plastic extrusions 40 need a certain amount of strength against bending, i.e., they restrain the edges of a batch of concrete and if a straight line is desired, extrusions 40 should be substantially straight. In many construction sites and conditions, however, extrusions 40 are subject to considerable heating from sun rays and extrusions 40 can become overly flexible. It will be understood that the wall thicknesses of extrusions 40 will be kept to a reasonable minimum, for reasons of economy. I have discovered this problem of sun heating and have devised a solution by making extrusions 40 very light colored, in fact to add a titanium compound, i.e., titanium dioxide, to substantially maximize sun reflection with a stark white surface. Titanium dioxide can also act as a UV stabilizer.

The extrusions, and other parts, are very durable against wear or damage and yet they are light, i.e., compare a worker carrying steel forms, wood forms 10 or plastic forms 40 as to how many he can carry, as to ease of work, etc. The plastic extrusion 40 is about one-third the weight of lumber, one-third the weight of aluminum per cubic inch, and one-ninth the weight of steel per cubic inch. This type of plastic extrusion can be forcibly bent to accommodate some curving in a sidewalk or the like, but the material has good memory to return to a straight condition. Selection of a plastic involves, among other things, cost considerations. Some possible plastics would be unduly expensive. Polyethylene has good memory, whereas PVC will set in a distorted condition. Polypropelene is another plastic that might be suitable in physical properties and as to cost. The use of the release agent largely avoids the problem of fouling with concrete, water, oil, paint, asphalt and other adhering or staining substances. It is feasible to remove the plastic form earlier in the process of concrete curing, without breaking the edge of the concrete, than is the case with wood or metal forms. To the extent any material, cured or uncured, clings to the plastic, it can be easily removed. The material is good at sub-zero temperatures and elevated temperatures are not too much of a problem when titanium dioxide is added to the plastic to reflect sun rays.

Plastic extrusion 40 can be of any desired length or cross-sectional dimensions. At least initially, the cross-sectional dimensions are likely to follow the dimensions of lumber forms. Extrusion 40 on one side has a lipped dove-tailed keyway 42 extending from end to end of the extrusion. The purpose of keyway 42 is to secure plastic clamps 44.

Clamp 44 has a base 45 fitting in keyway 42 and has an L-shaped arm 46 forming together with base 45 a C-shape. Locking means on arm 46 may take various forms but the locking means shown has proven to be highly satisfactory. This locking means consists of a locking cam 48 pivotally supported and operated by an integral handle 49. Cam lock 48 is disposed opposite to base 45. A stake 50 can be secured to extrusion 40 by clamping against the face of the extrusion by use of locking cam 48. Base 45 is given less thickness than the depth of keyway 42 so that when clamp 44 presses stake 50 to extrusion 40 the material of extrusion 40 can be distorted to help secure stake 50 and clamp 44 securely in place. As many stakes 50 and clamps 44 can be used as is desired on an extrusion 40.

Clamp 44 is presently being made of du Pont's Zytel Super-Tuf nylon, 30% glass fiber filled. The cam 48 is formed with a radius increasing at a rate of 0.002" per degree around the pivotal axis of the cam. Stakes 50 can be of wood or metal. Round steel pins have been quite satisfactory as stakes. Clamps 44 are presently being made of two sizes, for different thicknesses of stakes 50. The larger clamp has a gap from cam 48 to base 45 of about ⅛" to ½" from open to closed cam positions, whereas the smaller clamp has a gap from cam 48 to base 45 of about ⅜" to ¼" from open to closed cam positions.

Clamp 44 has a rectangular base 45 with a dimension across the narrow dimension of the rectangle to readily fit into dove-tailed keyway 42. FIG. 12 demonstrates this with the showing that the distance between the lips of keyway 42 is "x" and the width of the base is less than "x". FIG. 13 demonstrates that the dimension across the longer dimension of base 45 is greater than the distance between the lips of keyway 42 so that the base makes a press fit with the lips of keyway 42. Base 45 has a still longer dimension across corner-to-corner of the rectangle. This means base 45 is locked into keyway 42 by inserting the narrow dimension in keyway 42 (FIG. 12), by next turning base 45 so that the dimension from corner-to-corner distorts the lips of keyway 42 (FIG. 15), and by next turning base 45 so that the longer dimension across the rectangle makes a press fit with the lips of keyway 42 (FIGS. 13 and 16). Further securing of clamp 44 occurs, as before described, when stake 50 is clamped against the face of extrusion 42. The upper edges of base 45 should be chamfered or radiused to accommodate the turning movement of base 45 against the lips of keyway 42. Clamps 44 could be made differently as to securement to the extrusion, as to the means to clamp stakes 50, etc. The chamfer presently used in about forty-five degrees. A plurality of ribs 61 on base 45 and extending onto the adjacent portion of arm 46 can be used to provide additional frictional surfaces to engage a stake 50. FIGS. 22 and 23 show this feature.

As indicated, base 45 is generally rectangular and has a narrow dimension (up and down in FIG. 12) for insertion into dove-tailed keyway 42 as shown in FIG. 12 and has a longer dimension (generally horizontally in FIG. 12) to lock inside of the lips of dove-tailed keyway 42 as shown in FIG. 13. The diagonal dimension is even longer (generally up and down in FIG. 15 which Figure is intermediate the FIG. 12 and FIG. 13 positions of base 45). The lips of keyway 42 are somewhat distorted as base 45 turns between unlocked and locked positions. To facilitate this turning, latching action, two opposite corners 51, 53 are substantially curved or radiused. Corner 51 is radiused more generously than corner 53, whereby base 45 generally pivots about corner 53 and whereby arm 46 keeps bearing against stake 50 as clamp 44 is rotated by handle 49 to the FIG. 13 position wherein stake 50 can be clamped against the adjacent wall of extrusion 40.

The interior of connectors 12 have reinforcing walls 60 which may form a grid pattern.

Connectors 62 for use with extrusions 40 can be similar to connectors 12 as to the structure for locking and unlocking adjacent connectors. Extending in the direction of extrusion 40 are two end rectangular walls 66 and a center hollow square wall 68.

Extrusion 40 is extruded with a pair of lateral internal walls 70 thereby dividing the interior of the hollow extrusion into a pair of generally rectangular end passages 72 into which rectangular walls 66 fit and a central passage 74 into which square wall 68 fits. The assembly can be secured together by a staple 80 extending through extrusion 40 and into connector 62. End wall 82 of connector 62 can be of single wall thickness, rather than having considerable thickness as in connectors 12. The thickness of connectors 12 is to accommodate bosses 20 beyond the plane of the ends of wood forms 10. Bosses 20 can be accommodated within rectangular walls 66 that extend into end passages in extrusion 40, in the case of connectors 62

The preceding description has been mostly in terms of the use of the invention for concrete forms. It has other applications, however, such as permanent and temporary fencing used for corrals, landscaping, etc.; in backdrops in the theater and stage industry; other uses in the construction industry, etc. Connectors 12 might be used for temporary positioning or permanent joinder of wooden members, including use of one connector at the end of a piece of lumber and the other at the side of a piece of lumber.

Compared with wood forms, extrusions 40 are much more durable, easier and faster to use, more versatile, and more economical to purchase and use.

Extrusions 40 are made of a blend of high and low density polyethylene that gives it an extremely long life in the field. Unlike wood forms, extrusions 40 are impervious to all chemicals. Wood forms become dry and brittle after being subjected to the high concentration of lime present in concrete and must be protected through the application of expensive form oil. My plastic extrusions will not absorb the water and lime released by the concrete as it sets. Wood forms do absorb water and lime, causing them to warp and become brittle. This warpage is reduced, again, only through the application of expensive form oil.

After several uses, even with the application of form oil, wood forms will still crack, warp and splinter. My plastic extrusions 40 will not dry out and, therefore, will retain shape and surface for a much greater time.

The nail holes put into wood forms when attaching stakes to hold them in place also have a tendency to accelerate the splintering and cracking process described above.

With my plastic extrusions 40, the stakes are clamped to the form, eliminating the nailing problem. Where the ends of wood forms are butted together, they must be either toe-nailed together or have an additional wooden brace nailed to them. This causes the ends of the forms to be very quickly splintered and damaged. In face, most often the ends of the forms have to be trimmed before they can be reused. With my plastic extrusion 40, the forms are joined together with connectors 62 that fit into the end of each form, completely eliminating damage to the ends of the forms.

If wood forms are not stacked straight between uses they will warp permanently, making them unusable Since, my extrusions 40 will not take a permanent warp, even poor stacking will not make them unusable. Merely laying them flat again for a few minutes will cause them to straighten out.

In summary, wood forms can typically be used only one to three times, and only then with application of expensive form oil and care taken to stack them straight. On the other hand, my extrusions 40 can be used almost indefinitely, not warping, reacting to chemicals, splintering or requiring special care in stacking.

My plastic extrusions are extremely light, weighing approximately one-third as much as new wood forms, and even less in comparison with wood forms that have been treated with form oil. A man can typically carry only two 16-foot wood forms. That same man can easily carry six 16-foot extrusions 40, thereby greatly reducing the time required to carry forms to placement areas.

The most labor intensive step in setting up wood forms is nailing stakes to the forms and then renailing and renailing them as the forms are adjusted to put them in a straight line and at the proper grade (height). In fact, the nailing itself has a tendency to knock forms out of line by loosening stakes that have been pounded into the ground. Use of my extrusions 40 dramatically reduces the time required for this step (one-fourth to one-half the time using one-half the labor) through the use of its method of clamping the stake to the form, completely eliminating the nailing and renailing process. Instead of taking several minutes per stake for nailing, it takes a matter of seconds to attach or reattach a stake with a clamp. And, of course, clamping, unlike nailing, does not knock the form out of line.

Stripping the forms (removing the forms from the finished concrete) is a very labor-intensive activity Not only must the nails that hold the stakes to the forms be removed but also the nails that attach the form ends together must be removed from the forms. These operations take considerable labor. My extrusions greatly reduce the time required for both of these operations. The clamps are merely loosened to remove them from the stakes and the ends of extrusions 40, held together with connectors 62, are just unsnapped. No removing of nails is required.

Concrete sticks to wood forms, even when form oil is used. Concrete must be removed, another labor-intensive operation, if the forms are to be reused. My plastic extrusions 40 contain a release agent blended into the plastic. This agent, good for the life of the form prevents concrete from sticking to it, completely eliminating the cleaning operation.

The tendency of concrete to stick to wood forms can sometimes cause the finished concrete slab to crack when the forms are removed if the bond is especially tight or the concrete has oozed out and partially encapsulated the form. When my extrusions are used, this problem is completely eliminated since concrete won't stick to the plastic.

Wood forms can be used for straight work and in radius applications where the radius is 100 feet or more. My extrusions 40 also can be used for straight work but can be used in radius applications where the radius is as tight as five feet. If parallel kerfs are sawed through all but one side wall of extrusion 40, then the extrusions can be curved or bent abruptly.

The extrusion 40 also includes connectors 62 which can attach to connectors 12 for wood forms, allowing the plastic forms and wood forms to be connected directly together if desired.

Most of the economies of plastic extrusions 40 over wood forms, relating to their durability and ease and speed of use, have already been discussed. In summary:

(1) They can be used many more times than wood forms. Because of warpage, splintering, drying out and splitting, a typical wood form can be used from one to three times before being thrown away. My extrusions can be used almost indefinitely. There are some currently in use that have been used more than 100 times.

(2) Set-up and stripping times with my extrusions 40 are much less than those with wood due to elimination of nailing, the removal of nails and the cleaning of the forms after stripping. Clamps 44 and connectors 62 provide a much more time-efficient method of set-up and stripping.

(3) Less labor is needed to handle the forms due to their light weight.

(4) Expensive form oil, required to reduce (but not eliminate) wood warpage, drying out, and sticking of concrete, is not required with extrusions 40.

(5) Less yard labor is required with extrusions 40 than with wood. The forms need not be stacked straight, oiled or trimmed. In face, the forms can even be left on the trucks between usages, reducing handling labor.

Other cost savings over wood forms with plastic extrusions 40 include the complete elimination of nails (and thus the cost of nails) and the virtual elimination of damage to wood stakes since the principal cause of such damage is nailing and removing nails.

Most of the advantages that plastic extrusions 40 have over metal forms are identical to the ones they have over wood forms except in the area of durability. Where advantages are identical or nearly identical, the discussion above will not be repeated.

Plastic forms 40 have one basic durability advantage over metal forms—if a metal form is damaged, say, by being run over by a cement truck, it is ruined and cannot be reused. If a plastic form 40 is run over by that same cement truck, the damaged section can be cut out with any type of common saw, a couple of new connectors 62 can be inserted into the two exposed ends, the ends can be snapped together and the extrusions 62 can be, albeit a little shorter, ready for use.

My plastic forms 40 are approximately one-tenth the weight of metal forms. Where one man can typically carry six 16-foot plastic extrusions, it takes two men to carry one 10-foot metal form. The reduction in labor in handling forms 40 compared to metal forms is dramatic.

Although, like extrusions 40, metal forms do not require nails for attaching them to stakes, it is much more difficult to set them up because the stakes can be attached at only specific points on the form. This can cause problems if there happens to be a rock under the location where the stake must attach. With extrusions 40, clamps 44 can slide anywhere on the form, enabling the stakes 50 to be put anywhere.

Concrete sticks to metal forms very strongly, often requiring it to be removed with a hammer and chisel. Again, concrete does not stick to my plastic forms, simply flaking off when it is dry.

Metal forms can be used only for straight work. Extrusions 40, as mentioned above, can be used for straight and radius (to a 5-foot radius) work.

If metal forms are cut, the cut end cannot be attached to another form due to the attaching system. Extrusions 40 easily can be cut to any length desired and, with the easy insertion of another connector 62, can be connected to either another wood or plastic form.

The primary economy of extrusions 40 over metal forms comes from the labor savings in set-up, stripping, and cleaning. Due to their heavy weight and fixed placement of stakes, metal forms are extremely time consuming in set-up and stripping. Side by side comparisons have shown that it takes approximately $\frac{1}{3}$ the time to set-up and strip forms 40 as metal forms. As mentioned above, the time-consuming cleaning of the concrete from metal forms, is completely eliminated with forms 40.

Another economy of my plastic forms 40 over metal forms is that because of the heavy weight of the metal forms they are only available in 5- and 10-foot lengths, as opposed to 12 and 16 foot lengths for plastic forms 40. This causes additional labor to be expended due to the existence of more joints than with extrusions 40.

Having thus described my invention, I do not wish to be understood as limiting myself to the exact construction shown and described. Instead, I wish to cover those modifications of my invention that will occur to those skilled in the art upon learning of my invention and which are within the proper scope thereof.

I claim:

1. Construction means, comprising:
   (a) an elongated concrete form member,
   (b) a generally hollow polyethylene plastic extrusion of generally rectangular transverse cross-section forming said elongated concrete form member,
   (c) said extrusion having a wall at one side shaped into a lipped dove-tailed keyway that tapers as it goes outwardly and that extends from end to end of said extrusion,
   (d) a clamp having a base fitting in said keyway having an L-shaped arm forming together with said base a C-shaped and locking means on said arm opposite said base,
(e) said base having generally an elongated rectangular shape with the narrow dimension of the rectangular shape readily fitting into the dove-tailed keyway, with a dimension across the longer dimension of the rectangular shape making a press fit with the lips of the dove-tailed keyway, and having a still greater dimension across corner-to-corner of the rectangular shape so that the base is locked into the dove-tailed keyway by inserting the narrow dimension in said dove-tailed keyway, by next turning the base so that the dimension from corner-to-corner distorts the lips of said keyway, and by next turning the base so that the longer dimension across the rectangle make a press fit with the lips of the dove-tailed keyway, and
(f) a stake to support said concrete form member secured by said clamp and said stake being compressed against said wall of said extrusion by said locking means to help secure said clamp in place.

2. The construction means of claim 1 in which said concrete form member has an added ingredient of a release agent, and which has an added ingredient of an ultraviolet stabilizer.

3. The construction means of claim 2 in which said concrete form member includes a titanium compound so that said concrete form member has a white surface highly reflective of sun rays.

4. The construction means of claim 1 in which said locking means includes a cam mounted on said arm to rotate about an upright axis extending at right angles to the direction of said narrow dimension of said rectangular shape, and a handle connected to said cam for manual turning of said cam to wedge said stake against said wall of said extrusion and against said arm.

5. The construction means of claim 4 in which said base has a plurality of ribs on its face opposite to said locking means and in which said arm has a plurality of ribs on its side adjacent to said ribs on said base, said ribs extending in planes parallel to the direction of said narrow dimension of said rectangular section, said ribs providing added frictional securement of said stake.

6. The construction member of claim 5 in which said clamp is formed of fiber filled nylon plastic.

7. The construction means of claim 1 in which said base has chamfered edges on its sides pressing against said dove-tailed keyway and a pair of opposite corners of said base being rounded to facilitate turning in said keyway.

8. Construction means, comprising:
(a) an elongated concrete form member,
(b) a generally hollow ethylene plastic extrusion of generally rectangular transverse cross-section forming said elongated concrete form member,
(c) said extrusion having a wall at one side shaped into a lipped keyway that tapers as it goes outwardly and that extends from end to end of said extrusion,
(d) a clamp having a base fitting in said keyway and locking by distorting the lips of said keyway, an arm connected to said base, and locking means on said arm opposite to said base, and
(e) a stake to support said concrete form member secured by said clamp and said stake being compressed against said wall of said extrusion by said locking means.

9. The construction means of claim 8 in which said concrete form member has an added ingredient of a release agent, and which has an added ingredient of an ultraviolet stabilizer.

10. The construction means of claim 9 in which said concrete form member includes a titanium compound so that said concrete form member has a white surface highly reflective of sun rays.

11. The construction means of claim 8 in which said locking means includes a cam mounted on said arm and a handle connected to said cam for manual turning of said cam to wedge said stake against said wall of said extrusion.

12. The combination of two elongated concrete form construction members in end to end series whereby a first end of one construction member is adjacent to the second end of another construction member, and construction means connecting together said first and second ends, comprising:
(a) said first end and aid second end of said construction members having like dimensions transverse of the longitudinal axes of said construction members, a pair of identical plastic connectors each having a generally right-rectangular outline and generally matching said transverse dimensions of said first and second ends of said construction members and said plastic connectors generally abutting said first and second ends of said construction members,
(b) each connector having at least a pair of bosses and at least a pair of mating openings on its side toward the other connector, the pair of bosses being disposed in two opposite corners and the pair of openings being disposed in the other opposite corners, whereby bosses on each connector will mate with openings on the other connector,
(c) each boss having an annular rib and said ribs being sized to pres through said openings to latch the connectors together,
(d) each construction member being a generally hollow polyethylene plastic extrusion and means securing said connectors in the ends of said construction members, and
(e) said extrusion having an elongated rectangular cross-section and having a pair of lateral internal walls dividing said rectangular cross-section into a pair of generally rectangular end passages and a central generally rectangular passage and said connectors each having on its face toward said extrusion protrusions formed by walls joined together fitting into said end passages of said extrusion and fitting into said central passage, and means securing said connectors to said extrusions.

13. The combination of two elongated concrete form construction members in end to end series whereby a first end of one construction member is adjacent to the second end of another construction member, and construction means connecting together said first and second ends, comprising:
(a) said first end and said second end of said construction members having like dimensions transverse of the longitudinal axes of said construction members, a pair of identical plastic connectors each having a generally right-rectangular outline and generally matching said transverse dimensions of said first and second ends of said construction members and said plastic connectors generally abutting said first and second ends of said construction members, (b) each connector having at least a pair of bosses and at least a pair of mating openings on its side toward the other connector, the pair of bosses being disposed in two opposite corners and the pair of openings being disposed in the other opposite corners, whereby bosses on each connector will mate with openings on the other connector, (c) each boss having an annular rib and said ribs being sized to press through said openings to latch the connectors together, (d) each construction member being a generally hollow polyethylene plastic extrusion and means securing said connectors in the ends of said construction members, and (e) said extrusion at one side being shaped into a lipped dove-tailed keyway that tapers as it goes outwardly and extends from end to end of said extrusion, a stake and a clamp securing said stake to said construction member, said clamp being formed of plastic having a base fitting in said keyway and having an L-shaped arm forming together with said base a C-shape and locking means on said arm opposite said base so that said stake is clamped to said base, said base having generally an elongated rectangular shape with the narrow dimension of the rectangular shape readily fitting into the dove-tailed keyway, with the longer dimension of the rectangular shape making a press fit with the lips of the dove-tailed keyway, and having a still greater dimension across corner-to-corner of the rectangle so that the base is locked into the dove-tailed keyway by inserting the narrow dimension in said dove-tailed keyway, by next turning the base so that the dimension from corner-to-corner distorts the lips of said keyway, and by next turning the base so that the longer dimension across the rectangular shape makes a press fit with the lips of the dove-tailed keyway.

14. The construction means of claim 13 in which said extrusion has an added ingredient of a release agent, which has an added ingredient of an ultraviolet stabilizer, and which has an added ingredient of a titanium compound so that said extrusion has a white surface in order to reflect sun rays and reduce flexibility due to sun heating.

15. The construction means of claim 13 in which said locking means includes a cam mounted on said arm and a handle connected to said cam for manual turning of said cam to wedge said stake against said side of said extrusion.

16. Concrete form means including two pieces of elongated concrete form material and means connecting together their adjacent ends, comprising:

(a) said two pieces having identical elongated rectangular transverse cross-sections and being formed by plastic which has an added ingredient of a release agent, which has an added ingredient of an ultraviolet stabilizer, and which is light colored in order to reflect the sun rays and reduce flexibility due to sun heating, (b) a pair of identical connectors made out of ethylene plastic material and having elongated rectangular cross-section is generally matching said cross-sections of said two pieces, said connectors having first faces adjacent the ends of said two pieces and said connectors having means attaching each connector to the adjacent piece, said plastic connectors having second faces abutting each other, (c) each connector having a pair of bosses on and a pair of openings in its second face, the pair of bosses being disposed in two opposite corners and the pair of openings being disposed in the other opposite corners of said second face, the bosses on each connector fitting into the openings in the opposite connector, each piece having end hollow spaces to accommodate the bosses on the opposite connector extending through the openings in the adjacent connector, and (d) each boss having an annular rib spaced rom said second face of the associated connector a greater distance than the thickness of plastic material of the opposite connector around the openings therein thereby permitting limited angular adjustment between connectors, said ribs being continuous and being sized to press through said openings to latch said connectors together.

17. Concrete form means including two pieces of elongated concrete form material and mans connecting together their adjacent ends, comprising:

(a) said two pieces having identical elongated rectangular transverse cross-sections, and being formed of ethylene plastic, (b) a pair of identical connectors made out of plastic material and having elongated rectangular cross-sections generally matching said cross-sections of said two pieces, said connectors having first faces adjacent the ends of said two pieces and said connectors having means attaching each connector to the adjacent piece, said plastic connectors having second faces abutting each other, (c) each connector having a pair of bosses and a pair of openings on its second, abutting face, the pair of bosses being disposed in two opposite corners and the pair of openings being disposed in the other opposite corners of said second face, the bosses on each connector fitting into the openings in the opposite connector, (d) each boss having an annular rib spaced from said second face of the associated connector, said ribs being sized to press through said openings to latch said connectors together, (e) said openings being of generally circular outlines of a size to pass said ribs except for a plurality of spaced apart flats in said outlines so that said ribs must be forced past the flats by distortion of the plastic in order to latch said connectors together, and (f) each annular rib being spaced from said second face of the associated connector a greater distance than the thickness of plastic material of the opposite connector around the openings therein thereby permitting limited angular adjustment between connectors.

* * * * *